(12) United States Patent
Hori et al.

(10) Patent No.: US 7,699,528 B2
(45) Date of Patent: Apr. 20, 2010

(54) DYNAMIC BEARING DEVICE

(75) Inventors: Masaharu Hori, Mie-ken (JP); Tetsuya Kurimura, Mie-ken (JP)

(73) Assignee: NTN Corporation, Osaka (JP)

( * ) Notice: Subject to any disclaimer, the term of this patent is extended or adjusted under 35 U.S.C. 154(b) by 1289 days.

(21) Appl. No.: 11/134,501

(22) Filed: May 23, 2005

(65) Prior Publication Data
US 2005/0285349 A1 Dec. 29, 2005

(30) Foreign Application Priority Data
May 26, 2004 (JP) ............... 2004-156421
May 26, 2004 (JP) ............... 2004-156434

(51) Int. Cl.
*F16C 33/08* (2006.01)
(52) U.S. Cl. ...................... 384/107; 384/124
(58) Field of Classification Search ........ 384/107, 384/111, 112, 113, 121, 123, 124
See application file for complete search history.

(56) References Cited

U.S. PATENT DOCUMENTS

| | | | |
|---|---|---|---|
| 5,743,656 A | 4/1998 | Gomyo et al. | |
| 6,499,882 B2 * | 12/2002 | Takahashi et al. | 384/107 |
| 2004/0145260 A1 | 7/2004 | Tamaoka et al. | |
| 2005/0025405 A1 | 2/2005 | Tamaoka | |

FOREIGN PATENT DOCUMENTS

| | | |
|---|---|---|
| CN | 1576623 A | 7/2003 |
| JP | 06-178490 A | 6/1994 |
| JP | 09-217736 A | 8/1997 |
| JP | 11-273236 A | 10/1999 |
| JP | 2002-061641 A | 2/2002 |
| JP | 2003-056555 A | 2/2003 |
| JP | 2003-056556 A | 2/2003 |
| JP | 2003-172336 A | 6/2003 |
| JP | 2003-336636 A | 11/2003 |
| JP | 2004-176817 A | 6/2004 |

* cited by examiner

*Primary Examiner*—William C Joyce
(74) *Attorney, Agent, or Firm*—Arent Fox LLP

(57) ABSTRACT

A dynamic bearing device is provided, which can prevent abrasion powder generated when a sealing member is pushed into an inner circumference of a housing from entering the housing. A sealing member is inserted into an inner circumference of an opening of a housing with an adhesive interposed therebetween The adhesive moving forward in a pushing direction of the sealing member is retained by a capillary action in a lower tapered space between an outer circumference of the sealing member and the inner circumference of the housing. Abrasion powder is captured by the adhesive in the tapered space so as to be confined in the adhesive as a result of the setting of the adhesive.

6 Claims, 9 Drawing Sheets

DYNAMIC BEARING DEVICE

BACKGROUND OF THE INVENTION

1. Field of the Invention

The present invention relates to a dynamic bearing device for rotatably supporting a shaft member in a non-contact manner by a dynamic pressure effect of a lubricating oil, generated in a bearing gap. The bearing device is suitable for: a spindle motor for information equipment, for example, a magnetic disk device such as an HDD or an FDD, an optical disk device for a CD-ROM, a CD-R, a CD-RW a DVD-ROM, a DVD-RAM or the like, and a magneto-optical disk device for an MD, an MO or the like; a polygon scanner motor for a laser beam printer (LBP); and a small motor for electric equipment, for example, an axial fan and the like.

2. Description of the Related Art

The above-mentioned various motors are required to operate not only with high rotational accuracy but also at higher speed, lower cost, and lower noise. One of the components determining the required performance is a bearing for supporting a spindle of the motor. As this type of bearing, a dynamic pressure bearing having characteristics excellent in the above-mentioned required performance has been considered for use or has been put into practical use in recent years.

For example, in a dynamic bearing device incorporated into a spindle motor for a disk driving device such as an HDD, the following dynamic pressure bearing is used. The dynamic pressure bearing includes: a radial bearing portion for rotatably supporting a shaft member in a radial direction in a non-contact manner; and a thrust bearing portion for rotatably supporting the shaft member in a thrust direction in a non-contact manner. As the radial bearing portion of the dynamic pressure bearing, a groove for generating a dynamic pressure (a dynamic pressure generating groove) is provided in an inner circumferential face of a bearing sleeve or an outer circumferential face of the shaft member. As the thrust bearing portion, for example, a dynamic pressure bearing including dynamic pressure generating grooves formed in both end faces of a flange portion of the shaft member or surfaces opposed thereto (an end face of the bearing sleeve, an end face of a thrust member fixed to a housing and the like) is used (for example, Japanese Patent Application No. 2002-061641).

The bearing sleeve is normally fixed at a predetermined position on an inner circumference of the housing. In order to prevent a lubricating oil supplied to an internal space of the housing from being externally leaked, a sealing member is sometimes attached onto an inner circumference of an opening at one end of the housing.

The housing used in this type of dynamic bearing device normally includes: a cylindrical side; and a bottom provided at one end of the side. The bottom is not only integrally formed with the side but is also fixed to an inner circumference of one end of the side as a bottom member independent of the side in some cases.

Each of the components of these dynamic bearing devices is cleaned after fabrication so as to remove fine metal powder such as cut powder generated in processing.

In the above-described dynamic bearing devices, press-fitting is conceivable as general means of fixing the sealing member onto the inner circumference of the housing. In press-fitting, however, there is a possibility that abrasion powder such as fine metal power or resin powder (hereinafter, collectively referred to as "abrasion powder") is generated by a sliding friction between an outer circumference of the sealing member and an inner circumference of the housing along with the press-fitting so as to enter the housing. The abrasion powder entering the housing gets mixed with a lubricating fluid to enter the bearing portion, thereby adversely affecting the performance or the lifetime of the bearing.

Even in the case where the sealing member is fixed by a method other than the press-fitting, there is still a possibility that scoring occurs between the outer circumference of the sealing member and the inner circumference of the housing when the sealing member is pushed into the inner circumference of the housing to similarly generate the abrasion powder.

Although the press-fitting is also general as means of fixing the bottom member onto the inner circumference of one end of the housing, there is a possibility that the above-mentioned abrasion powder is similarly generated by a sliding friction between the outer circumference of the bottom member and the inner circumference of the housing to enter the housing.

An object of the present invention is to prevent the abrasion powder from entering the housing.

SUMMARY OF THE INVENTION

In the present invention, a dynamic bearing device comprises: a housing having one open end and the other end being closed; a bearing sleeve provided in the housing; a shaft member inserted into the bearing sleeve; and a sealing member for sealing the opening of the housing, the dynamic bearing device being for retaining the shaft member and the bearing sleeve in a non-contact manner by a dynamic pressure effect of a lubricating fluid generated in a radial bearing gap between the shaft member and the bearing sleeve, wherein an outer circumference of the sealing member is bonded to an inner circumference of the housing so as to be fixed thereto, and a tapered space for retaining an adhesive is interposed between the outer circumference of the sealing member and the inner circumference of the housing. A portion for closing the other end of the housing can not only be integrally formed with the housing but also be formed as an independent component. The tapered space can be open to any one of both end faces of the sealing member.

According to the above structure, even if abrasion powder is generated when the sealing member is pushed into the inner circumference of the opening of the housing, the abrasion powder is captured by the adhesive so as to be confined in the adhesive as a result of the setting of the adhesive. Therefore, the abrasion powder can be prevented from entering the housing along with a slide between the sealing member and the housing. Moreover, since the adhesive serves as a lubricant when the sealing member is pushed into the inner circumference of the housing, the generation of the abrasion powder is reduced while the pushing operation is facilitated.

Moreover, since the adhesive is retained on the reduced side of the tapered space by a capillary action in the tapered space, it is ensured that the adhesive is present between the inner circumference of the housing and the outer circumference of the sealing member, thereby obtaining great adhesion.

In particular, when the sealing member is pushed into the inner circumference of the housing, a phenomenon that the adhesive moves forward in the pushing direction of the sealing member occurs. If the movement is noticeable, it is expected that the adhesive enters between the end face of the sealing member and the end face of the bearing sleeve, which are in contact with each other, to adversely affect bearing performance. At this time, if the tapered space has such a shape that is gradually enlarged toward the closed end side of the housing, the adhesive moving forward in the pushing direction of the sealing member is retained on the reduced side of a tapered portion by the capillary action in the tapered space, the adhesive can be prevented from moving forward in the pushing direction. Furthermore, as the result of the enhancement of the effect for retaining the adhesive, the effect of the adhesive for capturing and confining the abrasion powder is also enhanced.

On the other hand, if the tapered space has such a shape that is gradually enlarged toward the open end side of the housing, the closed side of the housing with respect to the tapered space can be sealed by the lubricant retained by the capillary action in the tapered space after the sealing member is pushed into the inner circumference of the housing. In this case, if a step is provided for, in particular, the inner circumference of the housing so as to be located in the tapered space to face the exterior of the housing, the amount of the adhesive remaining in the tapered space after the push of the sealing member is increased, thereby further enhancing the sealing effect.

In the dynamic bearing device, the tapered space gradually enlarged toward the closed side of the housing and the tapered space gradually enlarged toward the open side of the housing can be both provided. In this case, the two tapered spaces are provided so as to be axially separated from each other and to be gradually enlarged in such a direction that they are separated from each other. As a result, the above-mentioned effects respectively produced by both the tapered spaces can be obtained at the same time.

Each of the tapered spaces described above can be formed by providing a tapered surface on at least one of the outer circumference of the sealing member and the inner circumference of the housing. Preferably, the tapered surface is provided on the outer circumference of the sealing member.

By the above structure, according to the present invention, even if the abrasion powder is generated when the sealing member is inserted into the inner circumference of the sealing member, the abrasion powder is captured by the adhesive so as to be confined in the adhesive as a result of the setting of the adhesive. Therefore, it is ensured that the abrasion powder can be captured so as to prevent the abrasion powder from entering the housing. Moreover, since the adhesive can be securely retained on the reduced side of the tapered space by the capillary action in the tapered space, a high fixing force can be obtained.

Moreover, in order to solve the above problem, the present invention provides a dynamic bearing device comprising: a housing; a bearing sleeve fixed to an inner circumference of the housing; a rotary member including a shaft portion inserted into the bearing sleeve; a bottom member for closing an opening of the housing; a radial bearing portion for generating a pressure in a radial direction in a radial bearing gap between the bearing sleeve and the shaft portion by a dynamic pressure effect of a lubricating fluid; and a thrust bearing portion for generating a pressure in a thrust direction in a thrust bearing gap formed between the rotary member and the housing by a dynamic pressure effect of the lubricating fluid, wherein the bottom member is pushed into the opening of the housing so as to be fixed thereto with an adhesive interposed therebetween. In this structure, the bottom member is a member independent of the housing, and does not face the thrust bearing gap.

According to this structure, even if the abrasion powder is generated when the bottom member is pushed into the inner circumference of the housing, the abrasion powder is captured by the adhesive so as to be confined in the adhesive as a result of the setting of the adhesive. Therefore, the abrasion powder is prevented from entering the housing along with the press-fitting of the bottom member. Moreover, since the adhesive serves as a lubricant in the press-fitting of the bottom member, the generation of the abrasion powder in the press-fitting is reduced while the pushing operation is facilitated.

In the press-fitting of the bottom member, a phenomenon that the adhesive moves forward in the pushing direction of the bottom member occurs. If the movement is noticeable, it is expected that the adhesive gets even to the vicinity of the rotary member inserted into the inner circumference of the bearing sleeve to adversely affect the smooth rotation of the rotary member. Therefore, in order to avoid such a situation, it is preferred to provide an inner tapered space for retaining the adhesive between the outer circumference of the bottom member and the inner circumference of the housing, the inner tapered space being adjacent to a press-fit part of the bottom member on the inner side of the housing. The adhesive moving forward in the pushing direction of the bottom member is retained on the press-fit part side of the inner tapered space by the capillary action in the inner tapered space so as to be prevented from flowing toward the rotary member. Moreover, as a result of the enhanced effect for retaining the adhesive, the effect of the adhesive for capturing and confining the abrasion powder is also enhanced.

Moreover, an outer tapered space for retaining the adhesive may be provided between the outer circumference of the thrust member and the inner circumference of the housing, the outer tapered space being adjacent to the press-fit part of the thrust member on the outer side of the housing. After the press-fitting of the bottom member, the lubricant retained by the capillary action in the outer tapered space allows the press-fit part to be sealed. In particular, if a step is provided for the inner circumference of the housing and is located in the outer tapered space to face the exterior of the housing, the amount of the adhesive remaining in the outer tapered space after the press-fitting of the bottom member is increased, thereby further enhancing the sealing effect of the press-fit part.

Furthermore, the inner tapered space, for retaining the adhesive, being adjacent to the press-fit part of the bottom member on the inner side of the housing and the outer tapered space, for retaining the adhesive, being adjacent to the press-fit part of the bottom member on the outer side of the housing can be provided between the outer circumference of the bottom member and the inner circumference of the housing. As a result, the above-described effects produced by both the tapered spaces can be obtained at the same time.

Each of the tapered spaces described above can be formed by providing a tapered surface on at least one of the outer circumference of the bottom member and the inner circumference of the housing. Preferably, the tapered surface is provided on the outer circumference of the sealing member.

Furthermore, in order to solve the above problem, the present invention provides a method of fabricating the dynamic pressure bearing described above, including the steps of: applying an adhesive onto an inner circumference of a housing; and pushing a bottom member into the inner circumference of the housing, to which the adhesive has been applied.

By the above configuration, according to the present invention, even if the abrasion powder is generated in the press-fitting of the bottom member, the abrasion powder is captured by the adhesive so as to be confined in the adhesive as a result of the setting of the adhesive. Therefore, it is ensured that the abrasion powder can be prevented from entering the housing along with the press-fitting of the bottom member. Moreover, since the adhesive serves as a lubricant during the press-fitting of the bottom member, the generation of the abrasion powder in the press-fitting is reduced while the pushing operation is facilitated.

Furthermore, the inner tapered space adjacent to the press-fit part of the bottom member on the inner side of the housing so as to retain the adhesive is provided between the outer circumference of the bottom member and the inner circumference of the housing. As a result, the adhesive moving forward in the pushing direction of the thrust member is retained by the capillary action in the inner tapered space so as to be retained on the side of the press-fit part to be prevented from flowing into the bearing. Therefore, such a situation that the smooth rotation of the bearing is adversely affected by the movement of the adhesive in press-fitting can be avoided. Moreover, as a result of the enhanced effect of the inner tapered space for retaining the adhesive, the effect of the adhesive for capturing and confining the abrasion powder is also enhanced.

Furthermore, the outer tapered space adjacent to the press-fit part of the bottom member on the outer side of the housing so as to retain the adhesive is provided between the outer circumference of the bottom member and the inner circumference of the housing. As a result, the lubricant retained by the capillary action in the outer tapered space allows the press-fit part to be sealed. In particular, if a step located in the outer tapered space so as to face the exterior of the housing is provided for the inner circumference of the housing, the amount of the adhesive remaining in the tapered space after the push of the bottom member is increased, thereby further enhancing the sealing effect.

BRIEF DESCRIPTION OF THE DRAWINGS

FIG. 7b is a plan view of the bearing sleeve viewed from a direction A in FIG. 7a;

DETAILED DESCRIPTION OF THE PREFERRED EMBODIMENTS

Hereinafter, embodiments of the present invention will be described.

Figure 1:
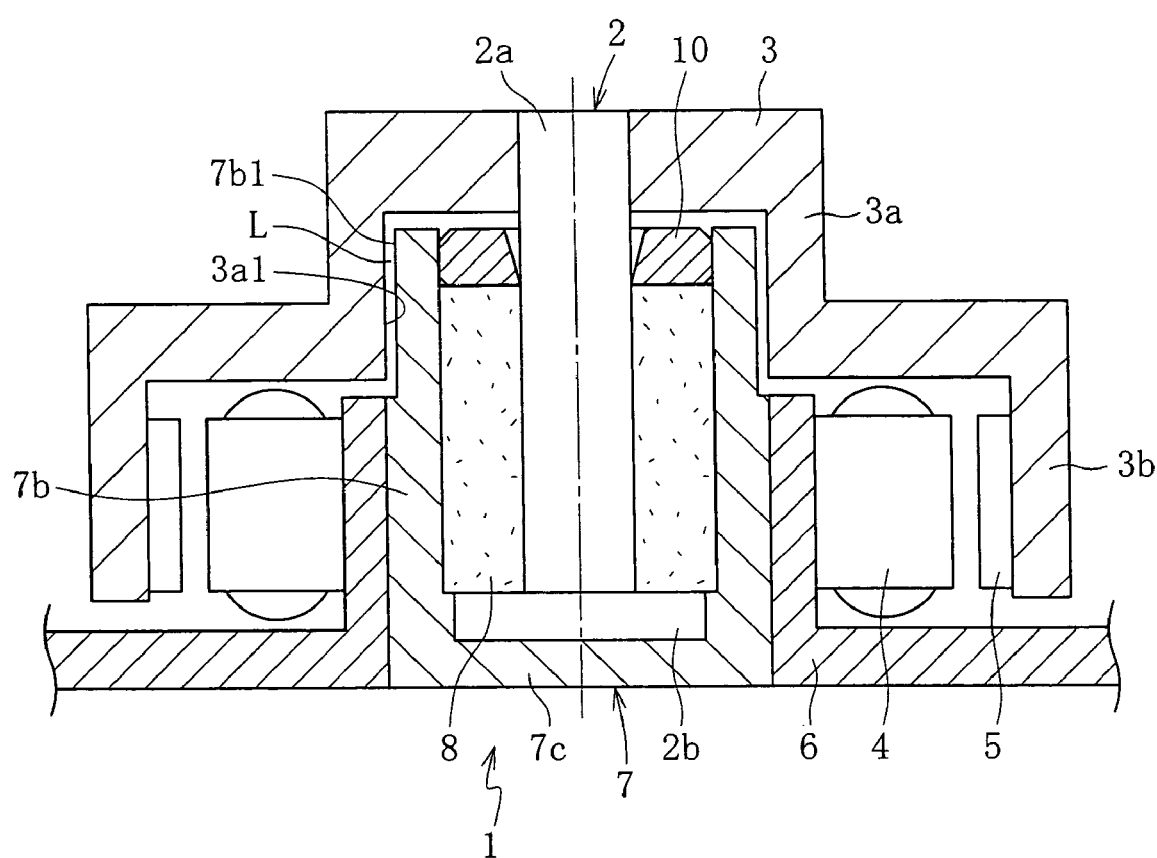
FIG. 1 is a sectional view of a spindle motor for information equipment.

FIG. 1 shows an example of the configuration of a spindle motor for information equipment, which incorporates a dynamic bearing device 1 according to this embodiment. The spindle motor is used for a disk driving device such as an HDD. The spindle motor includes: a dynamic bearing device 1 for rotatably supporting a shaft member 2 in a non-contact manner; a rotor (a disk hub) 3 attached to the shaft member 2; and a stator 4 and a rotor magnet 5 opposed to each other through, for example, a radial gap. The disk hub 3 includes a minor diameter cylindrical part 3a and a major diameter cylindrical part 3b. At least one disk not shown such as a magnetic disk is retained on an outer circumference of the minor diameter cylindrical part 3a. The stator 4 is attached onto an outer circumference of a bracket 6, whereas the rotor magnet 5 is attached onto an inner circumference of the major diameter cylindrical part 3b of the disk hub 3. The housing 7 of the dynamic bearing device 1 is attached onto an inner circumference of the bracket 6. When the stator 4 is energized, the rotor magnet 5 is rotated by an electromagnetic force between the stator 4 and the rotor magnet 5, which in turn causes the cooperative rotation of the disk hub 3 and the shaft member 2.

Figure 2:
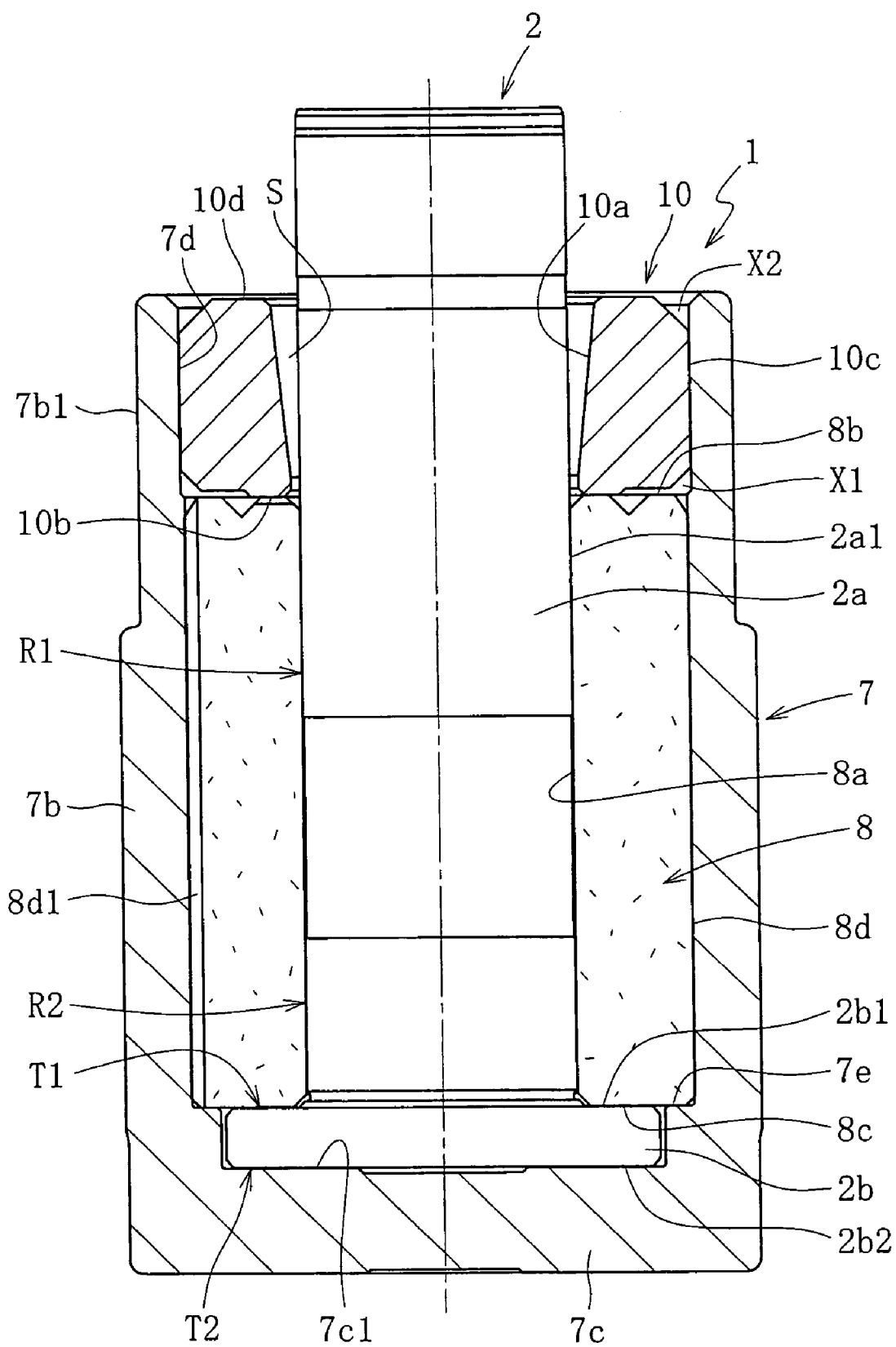
FIG. 2 is a sectional view showing one embodiment of a dynamic bearing device.

FIG. 2 shows the dynamic bearing device 1. The dynamic bearing device 1 includes as principal components: the bottomed cylindrical housing 7 having one open end and the other end being closed; the bearing sleeve 8 and the sealing member 10 fixed onto an inner circumference of the housing 7; and the shaft member 2.

A first radial bearing portion R1 and a second radial bearing portion R2 are provided so as to be axially separated from each other between an inner circumferential face 8a of the bearing sleeve 8 and an outer circumferential face 2a1 of a shaft portion 2a of the shaft member 2. Moreover, a first thrust bearing portion T1 is provided between a lower end face 8c of the bearing sleeve 8 and an upper end face 2b1 of a flange portion 2b of the shaft member 2, whereas a second thrust bearing portion T2 is provided between an inner bottom face 7c1 of a bottom 7c of the housing 7 and a lower end face 2b2 of the flange 21. For convenience of the description, the description will be given, referring the bottom 7c side of the housing 7 as a lower side and the side axially opposite thereto as an upper side.

The housing 7 is made of, for example, a soft metal material such as brass or a resin material such as a thermoplastic resin. The housing 7 includes: a cylindrical side 7b; and a bottom 7c integrally formed with the side 7b at a lowed end of the side 7b. An upper part 7b1 of an outer circumferential face of the side 7b is formed to have a smaller diameter than that of the remaining part. As shown in FIG. 1, a labyrinth seal L is formed between the minor diameter outer circumferential face 7b1 and an inner circumferential face 3a1 of the minor diameter cylindrical part 3a of the disk hub 3. The bottom 7c may be formed as a member independent of the side 7b.

The shaft member 2 is made of, for example, a metal material such as stainless steel. The shaft member 2 includes: the shaft portion 2a having the cylindrical outer circumferential face 2a1; and the flange portion 2b provided at a lower end of the shaft portion 2a so as to be integrally with or independent of the shaft portion.

The bearing sleeve 8 is, for example, a porous body made of a sintered metal, in particular, a porous body made of a sintered metal composed mainly of copper, which is formed in a cylindrical shape. The bearing sleeve 8 is fixed at a predetermined position on the inner circumferential face of the housing 7.

Figure 3A:
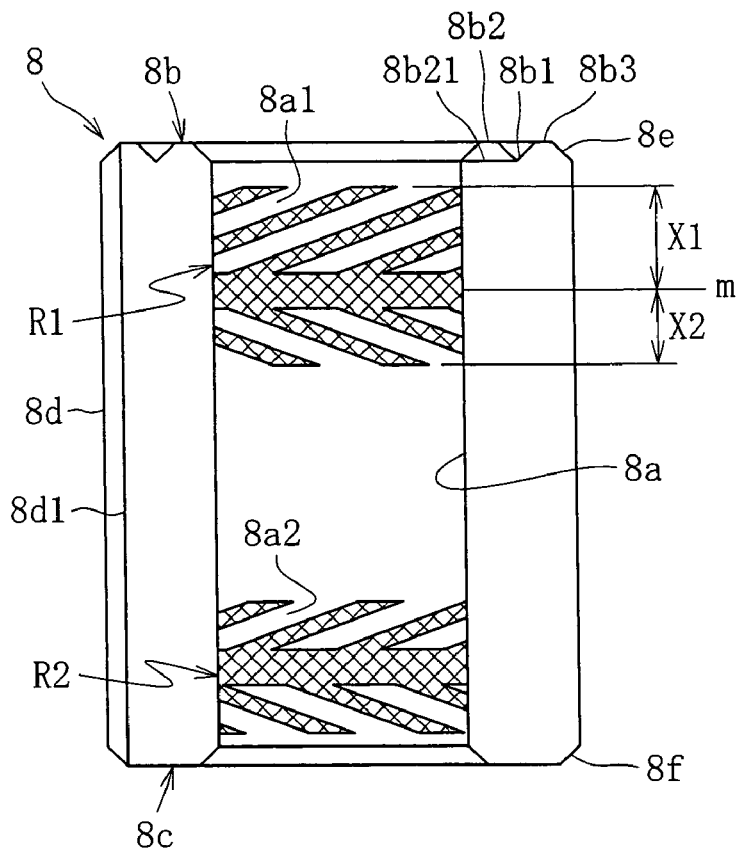
FIG. 3a is a sectional view of a bearing sleeve.

On the inner circumferential face 8a of the bearing sleeve 8 made of the sintered metal, two vertically located areas corresponding to radial bearing surfaces of the first radial bearing portion R1 and the second radial bearing portion R2 are provided so as to be axially separated from each other. In the two areas, dynamic pressure generating grooves 8a1 and 8a2 in a herringbone pattern, for example, as shown in FIG. 3(a) are formed, respectively. The upper dynamic pressure generating groove 8*a*1 is formed so as to be axially asymmetrical with respect to an axial center m (an axial center of an area between upper and lower oblique grooves). An axial dimension X1 of an upper area above the axial center m is greater than an axial dimension X2 of a lower area. Moreover, at least one axial groove 8*d*1 is formed in an outer circumferential face 8*d* of the bearing sleeve 8 over its total axial length. In this example, three axial grooves 8*d*1 are formed at circumferentially equal intervals. Moreover, chamfers 8*e* and 8*f* are formed at corners of the outer circumferences of the upper end face 8*b* and the lower end face 8*c* of the bearing sleeve 8, respectively.

Figure 3B:
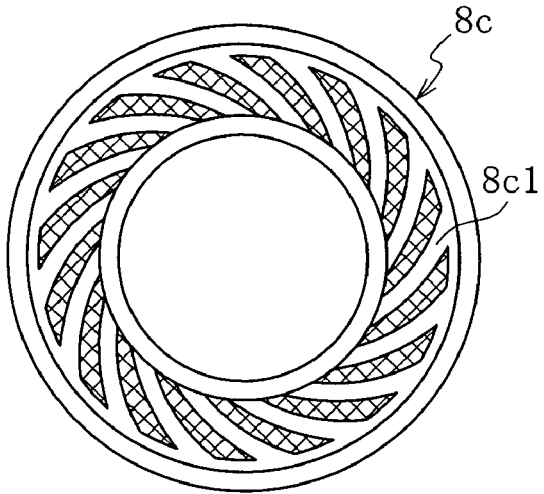
FIG. 3b is a plan view of a lower end face thereof.
Figure 3C:
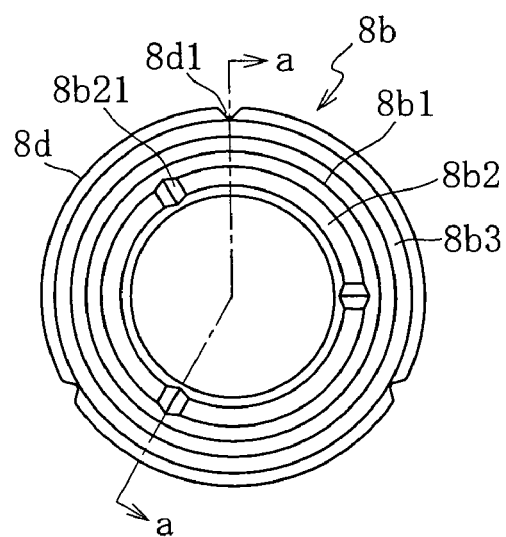
FIG. 3c is a plan view of an upper end face thereof.

Dynamic pressure generating grooves 8*c*1 in a spiral pattern, for example, as shown in FIG. 3(*b*), are formed in the lower end face 8*c* of the bearing sleeve 8, which serves as the thrust bearing surface of the first thrust bearing portion T1. Dynamic pressure generating grooves in a spiral pattern (not shown) are also formed in the inner bottom face 7*c*1 of the bottom 7*c* of the housing, which serves as the thrust bearing surface of the second thrust bearing portion T2. On any of the thrust bearing surfaces, a herringbone pattern, a radial groove pattern and the like may be used as a pattern of the dynamic pressure generating grooves. The thrust bearing surface carrying the dynamic pressure generating grooves may be formed on both end faces 2*b*1 and 2*b*2 of the flange 2*b* of the shaft member 2.

As shown in FIG. 3(*c*), the upper end face 8*b* of the bearing sleeve 8 is divided into a radially inner area 8*b*2 and a radially outer area 8*b*3 by a circumferential groove 8*b*1 having a V-shaped cross section, which is provided in approximately the middle in a radial direction. In the radially inner area 8*b*2, at least one radial groove 8*b*21 is formed. In this example, three radial grooves 8*b*21 are formed at circumferentially equal intervals.

The sealing member 10 is formed of a metal material such as brass or a resin material in an annular shape. The sealing member is fixed onto an inner circumference of an upper end of the side 7*b*, which corresponds to the opening side of the housing 7. An inner circumferential face 10*a* of the sealing member 10 forms a tapered surface having an upwardly gradually increased diameter. A tapered sealing space S is formed between the inner circumferential face 10*a* and the cylindrical outer circumferential face 2*a*1 of the shaft 2*a* opposed thereto. The sealing space S keeps a lubricating oil in the housing 7 by a capillary action so as to regulate the leakage of the lubricating oil to the outside of the housing 7. Contrary to the illustrated example, the inner circumferential face of the sealing member 10 may be formed in a cylindrical shape while the outer circumferential face 2*a*1 of the shaft 2*a* opposed thereto may be formed in a tapered shape to form the sealing space S.

Figure 4:
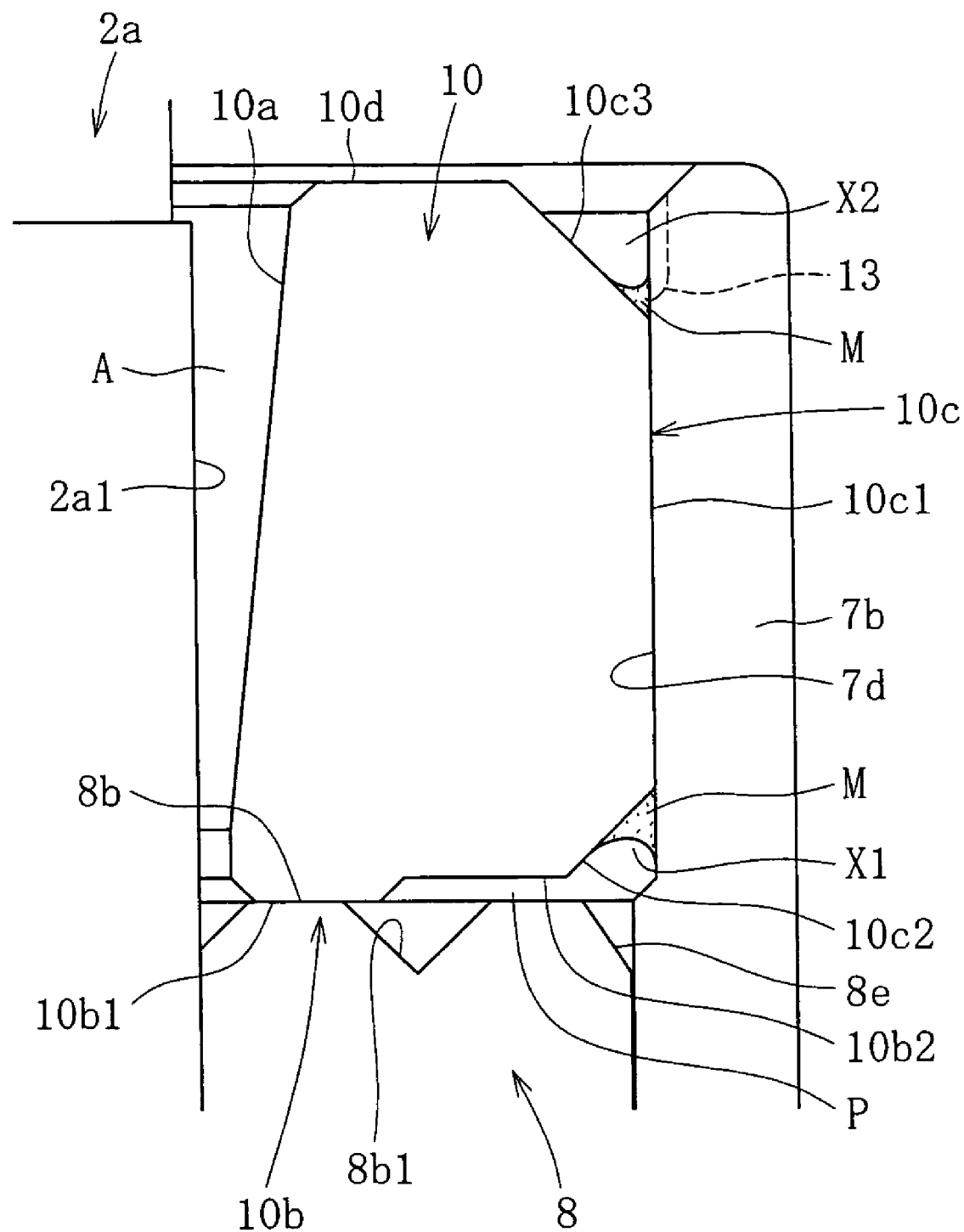
FIG. 4 is a partially enlarged sectional view showing the vicinity of an inner circumference of an upper end of a housing.

As shown in FIG. 4 in an enlarged manner, a lower end face 10*b* of the sealing member 10 has a step. A radially inner area 10*b*1 of the step comes into contact with the upper end face 8*b* of the bearing sleeve 8. A radially outer area 10*b*2 of the step is separated away from the upper end face 8*b* of the bearing sleeve 8 to form a thinned portion P with the upper end face 8*b*.

An outer circumference 10*c* of the sealing member 10 includes: a cylindrical face 10*c*1; a tapered surface 10*c*2 extended from a lower end of the cylindrical face 10*c*1 in a radially inward oblique direction to the lower end face 10*b*; and a tapered surface 10*c*3 extended from an upper end of the cylindrical face 10*c*1 in a radially inward oblique direction to an upper end face 10*d*. The cylindrical face 10*c*1 is parallel to the axis, and fitted into an inner circumference 7*d* of the opening of the housing by loose fitting with an adhesive interposed therebetween.

The dynamic bearing device 1 of this embodiment is assembled in, for example, the following steps.

First, the shaft member 2 is provided in the housing 7. Next, the bearing sleeve 8 is pushed into the inner circumference 7*d* of the housing 7 while the shaft 2*a* is being inserted into an inner circumferential hole of the bearing sleeve 8 so as to abut the lower end face 8*c* against a step 7*e* formed on the bottom side of the housing 7. As a result, the bearing sleeve 8 is axially positioned with respect to the housing 7. The bearing sleeve 8 is fixed to the inner circumference 7*d* of the housing 7 by press-fitting, bonding, a combination of press-fitting and bonding, or other appropriate fixing means.

Thereafter, the sealing member 10 is pushed into the opening at one end of the housing 7 to be pushed forward to a predetermined position with an adhesive interposed therebetween. The sealing member is fixed to the housing 7 as a result of the setting of the adhesive. Specifically, the adhesive is applied onto an upper end of the inner circumference 7*d* of the housing 7 (an area in which the sealing member is fixed). Thereafter, the sealing member 10 is pushed into the inner circumference 7*d* through the opening at the upper end of the housing 7 so that the lower end face 10*b* of the sealing member 10 (the radially inner area 10*b*1) abuts against the upper end face 8*b* of the bearing sleeve 8. Since the adhesive, which is present between the cylindrical face 10*c*1 and the inner circumference 7*d*, serves as a lubricant when the sealing member 10 is pushed, the generation of abrasion power in press-fitting is reduced while the pushing operation is facilitated.

FIG. 4 shows a state where the push of the sealing member 10 is completed. In this state, the cylindrical face 10*c*1 of the outer circumference 10*c* of the sealing member 10 is opposed to the inner circumference 7*d* of the housing 7 with an adhesive interposed therebetween (not shown). The first tapered space X1 is adjacent to the sealing member on the closed side of the housing 7 from the opposed part, whereas the second tapered space X2 is adjacent to the sealing member on the open side of the housing 7. The first tapered space X1 is formed between the lower tapered surface 10*c*2 of the outer circumference 10*c* of the sealing member 10 and the inner circumference 7*d* of the housing 7 so as to be gradually enlarged toward the lower side (the closed side of the housing) in which direction the sealing member 10 is pushed. The second tapered space X2 is formed between the upper tapered surface 10*c*3 of the outer circumference 10*c* of the sealing member 10 and the inner circumference 7*d* of the housing 7 so as to be gradually enlarged toward the upper side corresponding to the open side of the housing 7. Both of the tapered spaces X1 and X2 are open to the lower end face 10*b* and the upper end face 10*d* of the sealing member 10, respectively. In particular, the first tapered space X1 is also in communication with the thinned portion P and the circumferential groove 8*b*1.

With the push of the sealing member 10, the adhesive M moving forward in the press-fitting direction of the sealing member 10 is retained by the capillary action in the first tapered space X1. In pushing, abrasion powder generated by the scoring between the sealing member 10 and the inner circumference 7*d* of the housing and the like is captured by the adhesive M in the first tapered space X1 so as to be confined in the adhesive M as a result of the setting of the adhesive M. By the effect of the first tapered space X1 for retaining the adhesive M, the adhesive M is prevented from flowing toward the end face 8b of the bearing sleeve 8 while the effect of the adhesive M for capturing and confining the abrasion powder is enhanced.

Moreover, the adhesive M is retained by the capillary action in the second tapered space X2. The adhesive M allows a gap between the outer circumference 10c of the sealing member and the inner circumference 7d of the housing to be securely sealed in the housing situated inside of the second tapered space. In this case, in particular, as indicated with a broken line in FIG. 4, if a step 13 is provided for the inner circumference 7d of the housing 7 facing the second tapered space X2, the amount of the adhesive M remaining in the second tapered space X2 after the attachment of the sealing member 10 is increased, thereby further enhancing the sealing effect.

In the above embodiment, the case where the sealing member 10 is pushed into the inner circumference 7d of the housing 7 by loose fitting is exemplified. However, the sealing member 10 can also be pushed into the inner circumference of the housing 7 with the adhesive interposed therebetween so as to be fixed thereto. Although the amount of generated abrasion powder is increased due to a slide with the inner circumference 7d of the housing 7 in the case of press-fitting, it can be ensured that the abrasion powder is prevented from entering the housing 7 even in such a case.

Although the case where the first tapered space X1 and the second tapered space X2 are both provided is exemplified in the above embodiment, only any one of the tapered spaces may be provided as needed.

When the assembly is completed in the above-described manner, the shaft portion 2a of the shaft member 2 is inserted into the inner circumferential face 8a of the bearing sleeve 8. As a result, the flange portion 2b is housed within a space between the lower end face 8c of the bearing sleeve 8 and the inner bottom face 7c1 of the housing 7. Thereafter, the internal space of the housing 7 sealed by the sealing member 10, which includes internal pores of the bearing sleeve 8, is filled with a lubricating fluid, for example, a lubricating oil. An oil level of the lubricating oil is kept within the sealing space S.

In rotation of the shaft member 2, the areas of the inner circumferential face 8a of the bearing sleeve 8, which serve as the radial bearing surfaces (two vertically located areas), are opposed to the outer circumferential face 2a1 of the shaft portion 2a through radial bearing gaps, respectively. Moreover, an area of the lower end face 8c of the bearing sleeve 8, which serves as the thrust bearing surface, is opposed to the upper end face 2b1 of the flange portion 2b through a thrust bearing gap, whereas an area of the inner bottom face 7c1 of the bottom 7c, which serves as the thrust bearing surface, is opposed to the lower end face 2b2 of the flange portion 2b through a thrust bearing gap. With the rotation of the shaft member 2, a dynamic pressure of the lubricating oil is generated in the above-mentioned radial bearing gaps so that the shaft portion 2a of the shaft member 2 is rotatably supported in the radial direction in a non-contact manner by the oil film of the lubricating oil, which is formed in the radial bearing gaps. As a result, the first radial bearing portion R1 and the second radial bearing portion R2 for rotatably supporting the shaft member 2 in the radial direction in a non-contact manner are formed. At the same time, a dynamic pressure of the lubricating oil is generated in the above-described thrust bearing gap so that the flange portion 2b of the shaft member 2 is rotatably supported in both thrust directions in a non-contact manner by the oil film of the lubricating oil, which is formed in the thrust bearing gaps. As a result, the first thrust bearing portion T1 and the second thrust bearing portion T2 for rotatably supporting the shaft member 2 in the thrust direction in a non-contact manner are formed.

As described above, the dynamic pressure generating groove 8a1 of the first radial bearing portion R1 is axially asymmetrically formed with respect to the axial center m; the axial dimension X1 of the upper area above the axial center m is larger than the axial dimension X2 of the lower area (FIG. 3(a)). Therefore, in rotation of the shaft member 2, a pulling force (pumping power) of the dynamic pressure generating groove 8a1 for the lubricating oil is relatively larger in the upper area than in the lower area. By a differential pressure in the pulling force, the lubricating oil filling the gap between the inner circumferential face 8a of the bearing sleeve 8 and the outer circumferential face 2a1 of the shaft portion 2a flows downward. The lubricating oil circulates through a path from the thrust bearing gap of the first thrust bearing portion T1, the axial grooves 8d1, the thinned portion P, and the circumferential groove 8b1 to the radial groove 8b21 to return to the gap between the inner circumferential face 8a of the bearing sleeve 8 and the outer circumferential face 2a1 of the shaft portion 2a so as to be pulled into the radial bearing gap of the first radial bearing portion R1 again. If the dynamic bearing device is configured so that the lubricating oil flows and circulates in the internal space of the housing 7 in the above-mentioned manner, such a phenomenon that a pressure of the lubricating oil in the internal space becomes locally negative can be prevented from occurring to solve the problems such as the generation of air bubbles with the generation of a negative pressure, the leakage of the lubricating oil due to the generation of air bubbles, the generation of vibrations and the like. Moreover, even if air bubbles get into the lubricating oil for some reason, the air bubbles are exhausted from an oil level of the lubricating oil (a gas-liquid interface) in the sealing space S to the outside air when the air bubbles circulate with the lubricating oil. Therefore, the adverse effect of the air bubbles can be more effectively prevented.

A bearing structure of each of the bearing portions R1, R2, T1, and T2 is not limited to the above exemplified structure, and therefore can be changed to any of various bearing structures. For example, each of the radial bearings R1 and R2 can be constituted by a multi-lobe bearing (FIGS. 12a to 12c) or a step bearing, whereas each of the thrust bearing portions T1 and T2 can be constituted by a pivot bearing for supporting an end of the shaft member 2 by the bottom 7c of the housing in a contact manner.

Figures 5, 6:
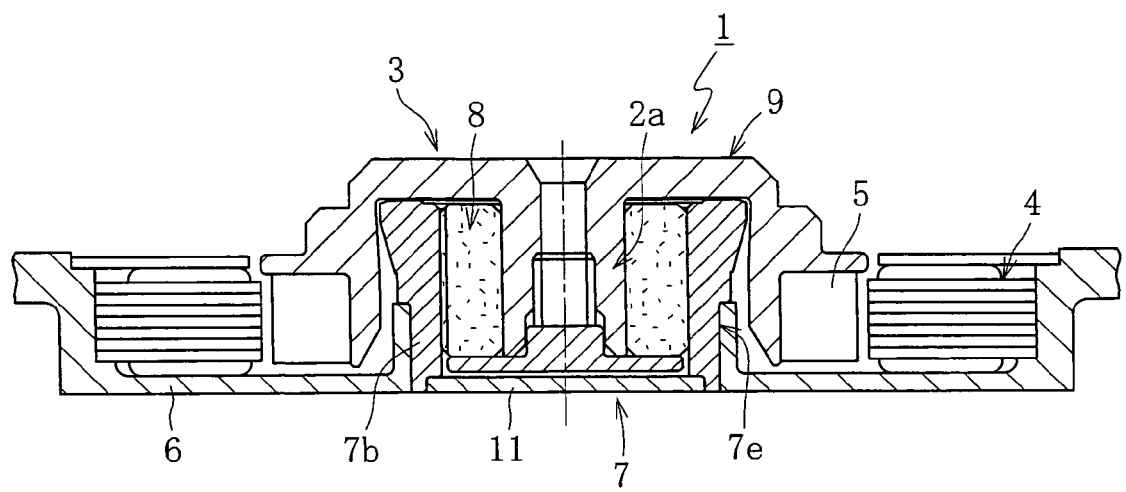
FIG. 5 is a sectional view of a spindle motor for information equipment.
FIG. 6 is a sectional view showing another embodiment of a dynamic bearing device.

FIG. 5 conceptually shows an example of the configuration of a spindle motor for information equipment incorporating the dynamic bearing device 1 according to another embodiment of the present invention. The spindle motor for information equipment is used for a disk driving device such as an HDD. The spindle motor includes: the dynamic bearing device 1 for rotatably supporting the rotary member 3; the stator 4 and the rotor magnet 5 opposed to each other through, for example, a radial gap; and the motor bracket 6. The stator 4 is attached onto the outer circumference of the motor bracket 6, whereas the rotor magnet 5 is attached onto the outer circumference of the rotary member 3. The housing 7 of the dynamic bearing device 1 is attached onto the inner circumference of the motor bracket 6. When the stator 4 is energized, the rotor magnet 5 is rotated by an electromagnetic force generated between the stator 4 and the rotor magnet 5, which in turn causes the cooperative rotation of the rotary member 3.

The dynamic bearing device 1 includes, for example, as shown in FIG. 6; the housing 7; a bottom member 11 for closing an opening at one end of the housing 7; the bearing sleeve 8 fixed into the inner circumference of the housing 7;

and the rotary member 3 relatively rotating with respect to the housing 7 and the bearing sleeve 8. For convenience of the description, the description will be given, referring the side covered with the bottom member 11 of the housing 7 as a lower side and the side axially opposite thereto as an upper side.

In the dynamic bearing device 1, the first radial bearing portion R1 and the second radial bearing portion R2 are provided so as to be axially separated from each other between the inner circumferential face 8a of the bearing sleeve 8 and the rotary member 3 (the outer circumferential face of the shaft portion 2a). Moreover, the first thrust bearing portion T1 is provided between the rotary member 3 (a lower end face 9a of a hub portion 9) and the housing 7 (the upper end face 7b2 of the side 7b), whereas the second thrust bearing portion T2 is provided between the rotary member 3 (an upper end face 12a of the flange portion 12) and the lower end face 8c of the bearing sleeve 8.

The rotary member 3 includes: the cylindrical shaft portion 2a inserted into the inner circumference of the bearing sleeve 8; the hub portion 9 radially outwardly extended from an upper end of the shaft portion 2a to cover an upper part and an upper end of the outer circumference of the housing 7; and the disc-like flange portion 12 fixed onto the lower end of the shaft portion 2a. In the illustrated example, the case where the shaft portion 2a and the hub portion 9 are integrally formed is exemplified. However, the shaft portion and the hub may be formed as separate members. A method of fixing the shaft portion 2a and the flange portion 12 to each other is arbitrary; FIG. 2 shows the case where screw connection is used as an example.

The hub portion 9 functions as a disk hub, and includes: a disc-like planar part 9a radially outwardly extended from the upper end of the shaft portion 2a; a cylindrical part 9b axially downwardly extended from an outer circumference of the planar part 9a; and a disk-mounting face 9c and a collar part 9d, which are formed so as to radially outwardly project beyond the cylindrical part 9b. At least one magnetic disk (not shown) is fitted into the outer circumference of the planar part 9a. The disks are supported from below by the disk mounting face 9c while being positioned and retained by appropriate retention means not shown.

The bearing sleeve 8 is, for example, a porous body made of a sintered material, in particular, a porous body made of a sintered metal composed mainly of copper, in a cylindrical shape.

Figure 7A:
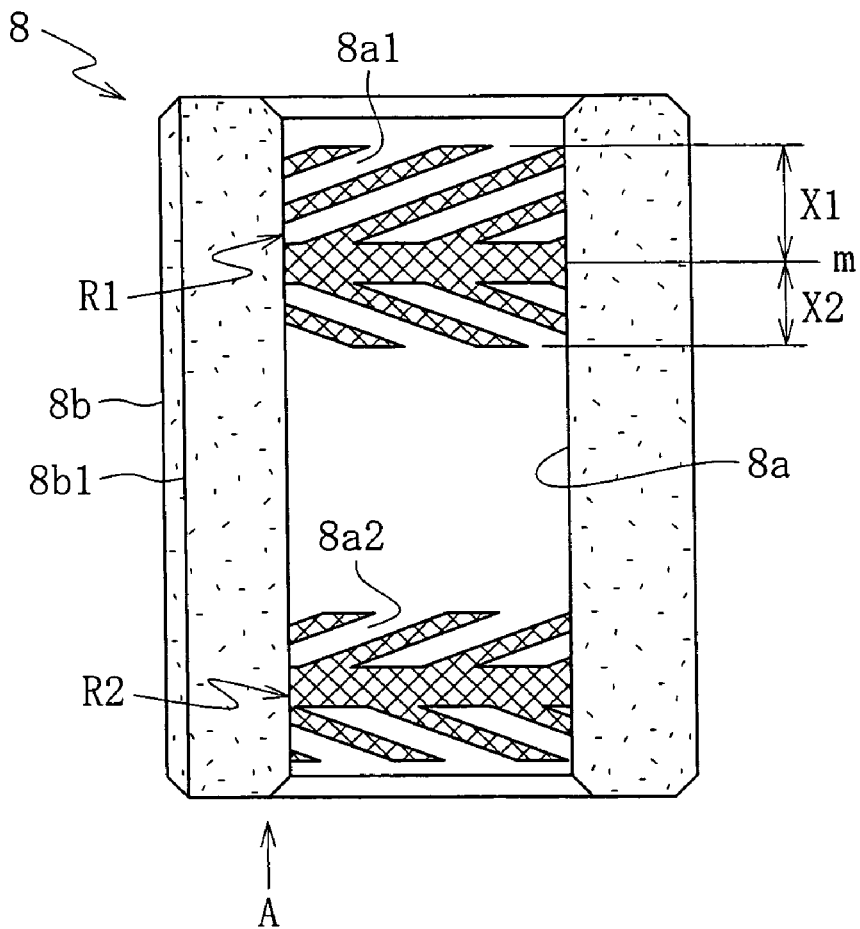
FIG. 7a is a sectional view of a bearing sleeve.

On the inner circumferential face 8a of the bearing sleeve 8, as shown in FIG. 6, two vertically located areas, which serve as radial bearing surfaces of the first radial bearing portion R1 and the second radial bearing portion R2, are provided so as to be axially separated from each other. In these two areas, for example, the dynamic pressure generating grooves 8a1 and 8a2 in a herringbone pattern as shown in FIG. 7a are formed, respectively. The upper dynamic pressure generating groove 8a1 is formed so as to be axially asymmetrical with respect to the axial center m (the axial center of the area between upper and lower oblique grooves). The axial dimension X1 of the upper area above the axial center m is greater than the axial dimension X2 of the lower area. Moreover, at least one axial groove 8b1 is formed in the outer circumferential face 8b of the bearing sleeve 8 over its total axial length. In this embodiment, three axial grooves 8d1 are formed at circumferentially equal intervals.

Figure 7B:
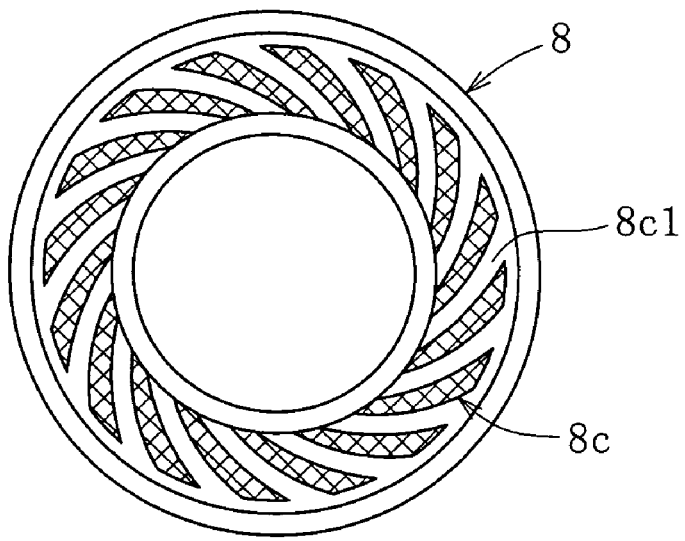

The dynamic pressure generating grooves 8c1 in a spiral pattern, for example, as shown in FIG. 7b, are formed in the lower end face 8c of the bearing sleeve 8, which serves as the thrust bearing surface of the thrust bearing portion T2.

Figure 8:
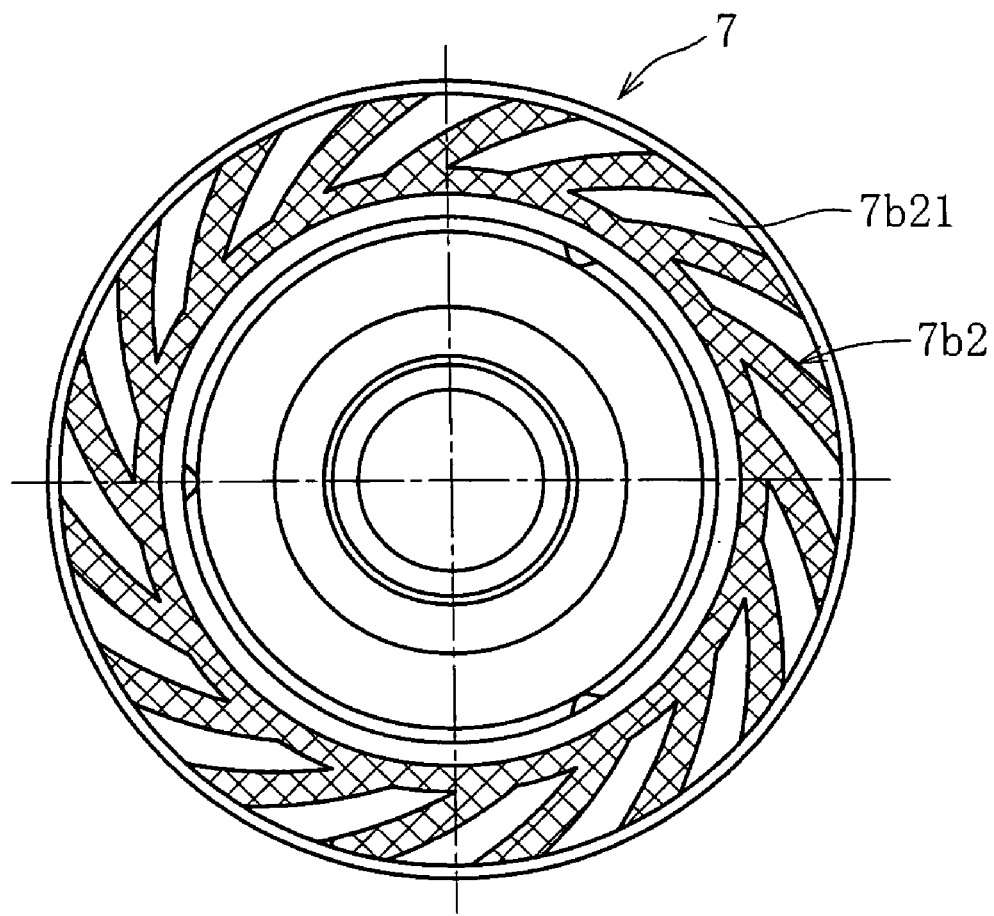
FIG. 8 is a plan view of the housing viewed from a direction B in FIG. 6.

The housing 7 is constituted by the cylindrical side 7b, and is made of a resin material in this embodiment. In an area of the upper end face 7b2 of the side 7b, which serves as the thrust bearing surface of the thrust bearing portion T1, for example, dynamic pressure generating grooves 7b21 in a spiral pattern as shown in FIG. 8 are formed. The dynamic pressure generating grooves 7b21 can be formed simultaneously by injection molding the side 7b with the use of a mold for forming the side 7b of the housing 7, wherein on the surface of the mold grooves for forming the dynamic grooves 7b21 are formed.

Moreover, as shown in FIG. 6, a tapered outer wall 7i having an upwardly gradually increasing diameter is formed on the outer circumference of the side 7b. The tapered outer wall 7i forms the annular sealing space S having an upwardly decreasing width with the inner circumferential face 9b1 of the cylindrical part 9b. The sealing space S is in communication with a radially outer part of the thrust bearing gap of the thrust bearing portion T1 in rotation of the shaft portion 2a and the hub portion 9.

A press-fit section 7g, into which the bottom member 11 is pushed, is formed at a lower end of the side 7b. The inner circumference 7g1 of the press-fit section 7g has a larger diameter than that of the inner circumferential face 7d onto which the bearing sleeve 8 is fixed. A thickness of the press-fit section 7g is smaller than that of the side 7b. A step 7g11 (see FIG. 11) facing the exterior of the housing 7 is formed on the inner circumference 7g1 of the press-fit section 7g. In this embodiment, the step 7g11 has a tapered surface with a downwardly gradually increasing diameter. On the outer circumference of the housing 7 (the outer circumference of the side 7b), a fixed surface 7h to be fixed onto the inner circumference of the motor bracket 6 shown in FIG. 1 is formed.

Figure 9:
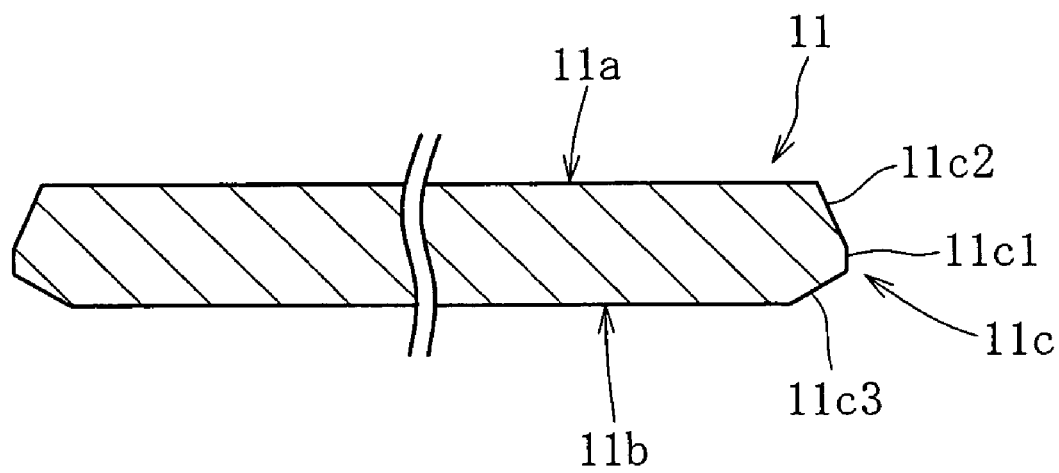
FIG. 9 is a sectional view of a bottom member.

The bottom member 11 is made of, for example, a metal material such as stainless steel or brass, and is pushed and bonded so as to be fixed to the inner circumference of the press-fit section 7g of the housing 7 by the procedure described below. As shown in FIG. 9, an outer circumference 11c of the bottom member 11 includes; a press-fit surface 11c1 pushed into the inner circumference 7g1 of the press-fit section of the housing 7; a tapered surface 11c2 radially inwardly extended in an oblique direction from an upper end of the press-fit surface 11c1 to the upper end face 11a; and a tapered surface 11c3 radially inwardly extended in an oblique direction from a lower end of the press-fit surface 11c1 to the lower end face 1b. The press-fit surface 11c1 is parallel to the axis.

The dynamic bearing device 1 in this embodiment can be assembled, for example, in the following steps.

For example, the bearing sleeve 8 is fixed onto the inner circumferential face 7d of the housing 7 by appropriate means such as press-fitting, bonding, a combination of press-fitting and bonding, or welding. Next, the rotary member 3, which is an integrally molded product including the hub portion 9 and the shaft portion 2a, is inserted into the inner circumference of the bearing sleeve 8. If an inner diameter dimension of the bearing sleeve 8 is measured while the bearing sleeve 8 is being fixed to the housing 7 so as to obtain dimensional matching with an outer diameter dimension of the shaft portion 2a (measured in advance), the radial bearing gap can be set with good accuracy.

Figure 10:
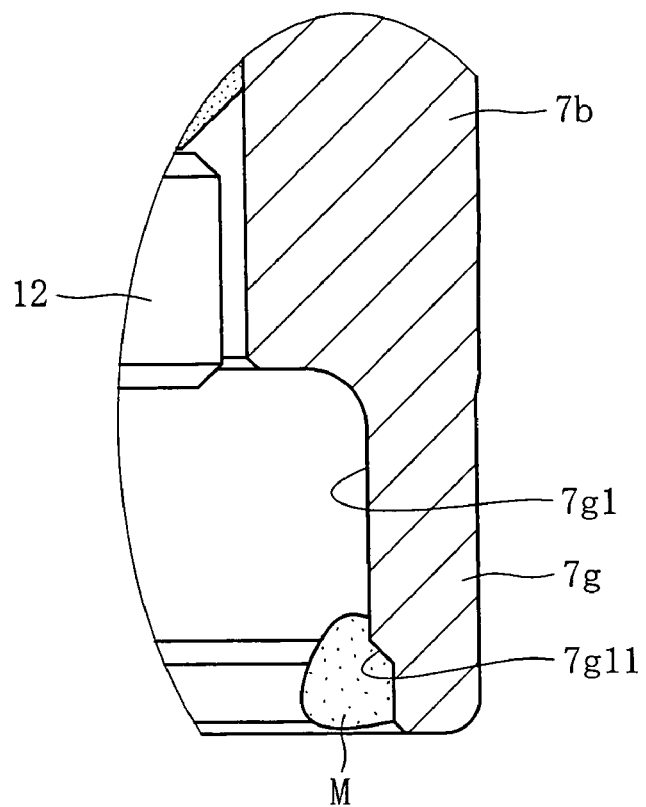
FIG. 10 is a partially enlarged sectional view showing the vicinity of an opening at a lower end of the housing.

Next, after the flange 12 serving for retention is attached to the shaft portion 2a, the bottom member 11 is pushed to a predetermined position of the inner circumference 7g1 of the press-fit section 7g of the housing 7 with the adhesive interposed therebetween so as to be fixed thereto. Specifically, as shown in FIG. 10 in an enlarged manner, the adhesive M is applied to the lower end of the inner circumference 7g1 of the press-fit section of the housing 7. Thereafter, the bottom member 11 is pushed into the inner circumference 7g1 of the press-fit section. Since the adhesive M serves as a lubricant in press-fitting of the bottom member 11, the generation of abrasion powder in press-fitting is reduced while the press-fitting operation is facilitated.

Figure 11:
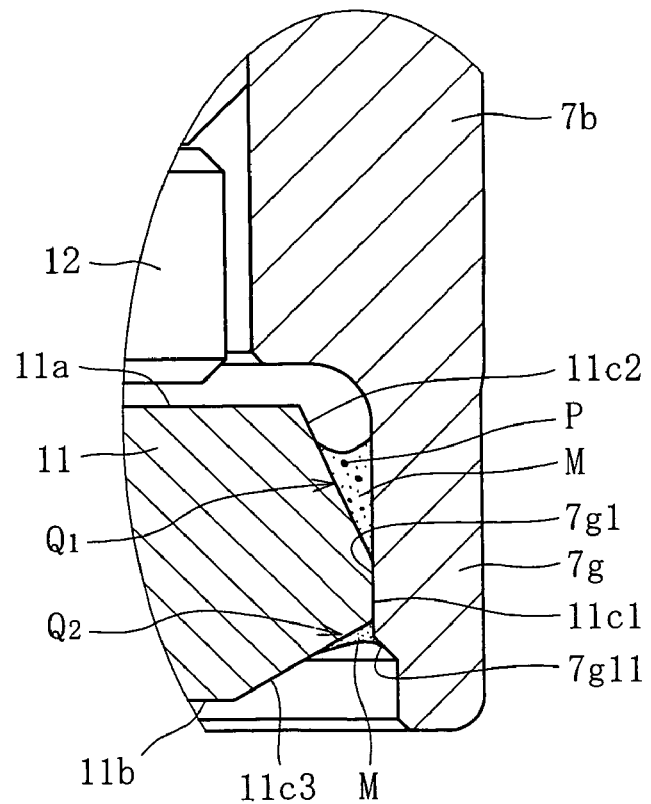
FIG. 11 is a partially enlarged sectional view showing a state where a bottom member is pushed into an inner circumference of the lower end of the housing.

FIG. 11 shows a state where the press-fitting of the bottom member 11 is completed. The press-fit surface 11c1 of the outer circumference 11c of the bottom member 11 is fitted into the inner circumference 7g1 of the press-fit section of the housing 7 with a predetermined fitting allowance. An inner tapered space Q1 is adjacent to the press-fit part on the inner side of the housing 7, whereas an outer tapered space Q2 is adjacent thereto on the outer side of the housing 7. The inner tapered space Q1 is formed between an upper tapered surface 11c2 of the outer circumference 11c and the inner circumference 7g1 of the press-fit section, and has such a shape that gradually decreases toward the press-fit section. The outer tapered space Q2 is formed between the lower tapered surface 11c3 of the outer circumference 11c and the inner circumference 7g1 of the press-fit section, and has such a shape that gradually decreases toward the press-fit section. The inner tapered space Q1 and the outer tapered space Q2 are both open to the upper end face 11a and the lower end face 11b of the bottom member 11, respectively.

With the press-fitting of the bottom member 11, the adhesive M moving forward in the press-fitting direction of the bottom member 11 is retained by the capillary action in the inner tapered space Q1. Abrasion powder P generated in the press-fitting of the bottom member 11 is captured by the adhesive M in the inner tapered space Q1 so as to be confined in the adhesive M as a result of the setting of the adhesive M. By the effect of the inner tapered space Q1 for retaining the adhesive M, the adhesive M is prevented from flowing toward the shaft 2 while the effect of the adhesive M for capturing and confining the abrasion powder P is enhanced.

Moreover, the adhesive M also serving as a lubricant is retained by the capillary action in the outer tapered space Q2. The lubricant allows the press-fit part of the bottom member 11 to be sealed. In particular, if the step 7g11 is provided for the inner circumference 7g1 of the press-fit section of the housing 7, the amount of the adhesive M remaining in the outer tapered space Q2 after the press-fitting of the bottom member 11 is increased, thereby further enhancing the sealing effect.

When the assembly is completed in the above-described manner, the shaft portion 2a of the rotary member 3 is inserted into the inner circumferential face 8a of the bearing sleeve 8. As a result, the flange portion 12 is housed within a space between the lower end face 8c of the bearing sleeve 8 and the upper end face 11a of the bottom member 11. Thereafter, the internal space surrounded by the housing 7, the hub portion 9 and the bottom member 11, which includes internal pores of the bearing sleeve 8, is filled with a lubricating fluid, for example, a lubricating oil. An oil level of the lubricating oil is kept within the sealing space S.

When the rotary member 3 is rotated, the two vertically located areas of the inner circumferential face 8a of the bearing sleeve 8, which serve as the radial bearing surfaces, are opposed to the outer circumferential face 2a1 of the shaft 2a through radial bearing gaps, respectively. With the rotation of the shaft portion 2a, the lubricating oil filling the radial bearing gaps generates a dynamic pressure effect. The shaft portion 2a is rotatably supported in the radial direction in a non-contact manner by the generated pressure. As a result, the first radial bearing portion R1 and the second radial bearing portion R2 for rotatably supporting the rotary member 3 in the radial direction in a non-contact manner are formed.

Moreover, a thrust bearing gap is formed between the upper end face 7b2 of the side 7b of the housing 7 and the lower end face 9a1 of the hub portion 9. With the rotation of the rotary member 3, the lubricating oil filling the thrust bearing gap generates a dynamic pressure effect. The rotary member 3 is rotatably supported in the thrust direction in a non-contact manner by the generated pressure. As a result, the thrust bearing portion T1 for rotatably supporting the rotary member 3 in the thrust direction in a non-contact manner is formed. Similarly, a thrust bearing gap is formed between the lower end face 8c of the bearing sleeve 8 and the upper end face 12a of the flange 12. A dynamic pressure effect of the lubricating oil is generated in the thrust bearing gap. As a result, the second thrust bearing portion T2 for rotatably supporting the rotary member 3 in the thrust direction in a non-contact manner is formed.

According to the dynamic bearing device, the thrust bearing portion T1 is formed between the upper end face 7b2 of the housing 7 and the lower end face 9a1 of the hub portion 9 so that the sealing space S for sealing the opening at the upper end of the housing 7 is provided on the radially outer side of the housing 7. Therefore, as compared with the dynamic bearing device including the sealing space S provided for the upper part of the housing 7, the axial dimension of the dynamic bearing device 1 can be reduced.

The embodiments of the present invention have been described above. However, the present invention is not limited to the embodiments above.

For example, although the first and second thrust bearing portions T1 and T2 are provided so as to support thrust loads in both directions in the embodiments, the second thrust bearing portion T2 can be omitted if there is no inconvenience. In this case, the flange portion 12 of the rotary member 3 and the dynamic pressure generating grooves 8c1 formed in the lower end face 8c of the bearing sleeve 8 are no longer needed.

In the embodiments, the case where the thrust bearing portion T1 between the housing 7 and the rotary member 3 is formed between the upper end face 7b2 of the housing 7 and the lower end face 9a1 of the hub portion 9 has been exemplified. Besides this structure, the present invention can be similarly applied to the case where, for example, a thrust plate independent of the bottom member 11 is provided on the opening side of the housing with respect to the bottom member 11 and the thrust bearing portion T1 is formed between the thrust plate and the flange portion 12 although the illustration of the thrust plate is omitted herein.

The bearing structure of each of the radial bearing portions R1 and R2 is not limited to the above exemplification, and can be changed to various bearing structures. For example, the radial bearing portions may be constituted by a multi-lobe bearing or a step bearing.

Figure 12A:
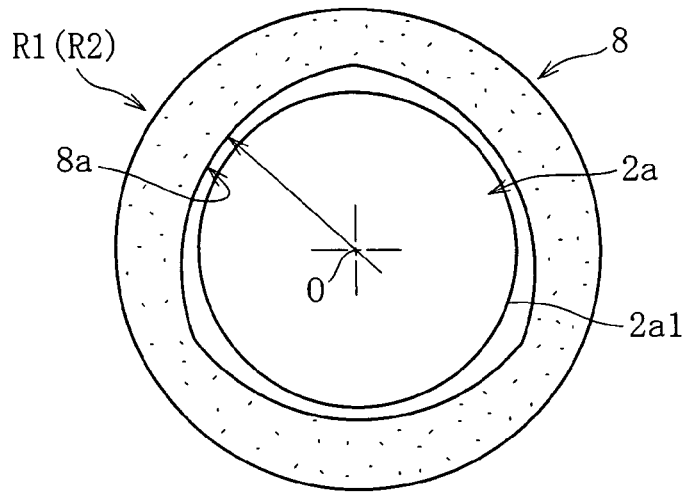
FIGS. 12a, 12b, and 12c are sectional views showing other embodiments of the radial bearing portion.
Figure 12B:
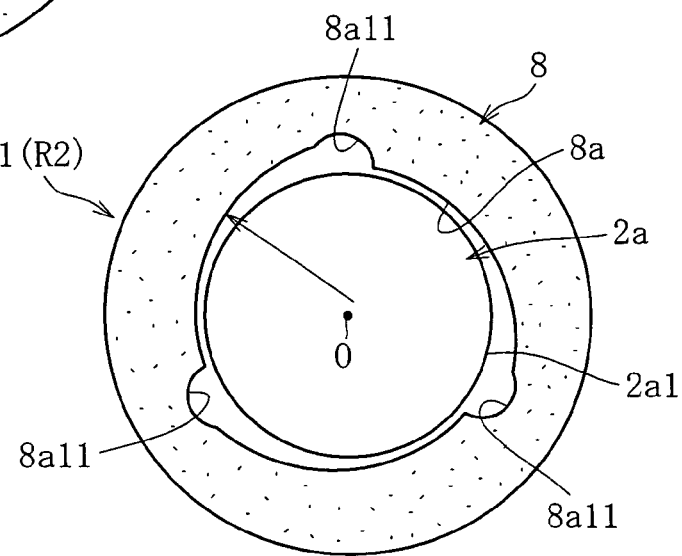
Figure 12C:
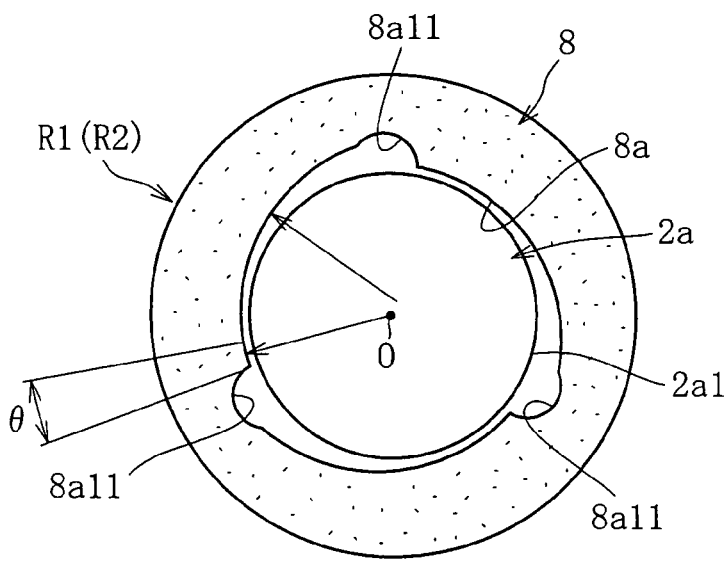

FIGS. 12a to 12c show examples of the circular bearing. Among them, FIG. 12a shows the following circular bearing; a multi-lobe surface having a center of curvature offset from a center of an axis O is formed on the inner circumferential face 8a of the bearing sleeve 8. A radial bearing gap between the inner circumferential face 8a and the outer circumferential face 2a1 of the bearing 2a is reduced in both circumferential directions in a wedge-like manner. FIG. 12b shows a circular bearing, also referred to as a taper bearing. A multi-lobe surface is formed on the inner circumferential face 8a of the bearing sleeve 8. The radial bearing gap is reduced in one circumferential direction in a wedge-like manner. At each boundary between the circular surfaces, an axial grooves 8a11 having a larger depth, referred to as a separation groove, is formed. FIG. 12c is a circular bearing also referred to as a taper flat bearing. In the structure shown in FIG. 12b, a predetermined area θ of each circular surface on the side of the minimum gap is formed by a concentric arc having the center of the axis O as a center of curvature.

What is claimed is:

1. A dynamic bearing device comprising:
    a housing having one open end and the other end being closed;
    a bearing sleeve provided in the housing;
    a shaft member inserted into the bearing sleeve; and
    a sealing member for sealing the opening of the housing, wherein an end face of the sealing member abuts against an end face of the bearing sleeve,
    the dynamic bearing device being for retaining the shaft member and the bearing sleeve in a non-contact manner by a dynamic pressure effect of a lubricating fluid generated in a radial bearing gap between the shaft member and the bearing sleeve,
    wherein an outer circumference of the sealing member is bonded to an inner circumference of the housing so as to be fixed thereto, and
    a first tapered space for retaining an adhesive is interposed between the outer circumference of the sealing member and the inner circumference of the housing, wherein the first tapered space is open to the end face of the sealing member, and has a shape that is gradually enlarged toward the closed end of the housing, and wherein the end face of the sealing member is formed with a recessed portion adjacent the first tapered space such that the sealing member is separated away from the end face of the bearing sleeve in a radially inner side of the first tapered space.

2. A dynamic bearing device according to claim 1, wherein a tapered surface for forming the first tapered space is provided on the outer circumference of the sealing member.

3. A motor comprising the dynamic bearing device according to claim 1.

4. The dynamic bearing device according to claim 1, further comprising a second tapered space for retaining the adhesive is interposed between the outer circumference of the sealing member and the inner circumference of the housing.

5. The dynamic bearing device according to claim 4, wherein the second tapered space is open to the other end face of the sealing member.

6. The dynamic bearing device according to claim 4, wherein the second tapered space has a shape that is gradually enlarged toward the open end of the housing.

* * * * *